United States Patent [19]

Long et al.

[11] Patent Number: 5,416,909
[45] Date of Patent: May 16, 1995

[54] INPUT/OUTPUT CONTROLLER CIRCUIT USING A SINGLE TRANSCEIVER TO SERVE MULTIPLE INPUT/OUTPUT PORTS AND METHOD THEREFOR

[75] Inventors: Marty L. Long, Meas; James Ward, Gilbert, both of Ariz.

[73] Assignee: VLSI Technology, Inc., San Jose, Calif.

[21] Appl. No.: 962,450

[22] Filed: Oct. 16, 1992

Related U.S. Application Data

[63] Continuation-in-part of Ser. No. 583,417, Sep. 14, 1990, abandoned.

[51] Int. Cl.⁶ .............................................. G06F 3/00
[52] U.S. Cl. ................................. 395/275; 364/238; 364/238.2; 364/238.3; 364/DIG. 1
[58] Field of Search ............... 395/500, 325, 200, 375

[56] References Cited

U.S. PATENT DOCUMENTS

| | | | |
|---|---|---|---|
| 4,100,601 | 7/1978 | Kaufman et al. | 395/275 |
| 4,124,889 | 11/1978 | Kaufman et al. | 395/275 |
| 4,396,915 | 8/1983 | Farnsworth et al. | 340/870.03 |
| 4,574,355 | 3/1986 | Beatty et al. | 364/492 |
| 4,825,402 | 4/1989 | Jalali | 395/500 |

*Primary Examiner*—Thomas C. Lee
*Assistant Examiner*—Felicia Ives
*Attorney, Agent, or Firm*—Harry M. Weiss & Associates

[57] ABSTRACT

An input/output (I/O) controller uses a single transceiver to service multiple I/O ports in a small computer system, such as an IBM PS/2 computer. Arbitration logic controls the access of the ports to the transceiver, and once the arbitration logic directs one of the ports to the transceiver, all other I/O devices are locked out until the transfer to or from the current I/O device is complete. Once the current transfer is complete, the arbitration logic then goes back to arbitrating, looking for the next I/O device that needs service. The associated circuitry to implement the arbitration and control logic is much smaller than the circuitry required for an additional transceiver, resulting in a lower system cost.

5 Claims, 2 Drawing Sheets

5,416,909

INPUT/OUTPUT CONTROLLER CIRCUIT USING A SINGLE TRANSCEIVER TO SERVE MULTIPLE INPUT/OUTPUT PORTS AND METHOD THEREFOR

RELATED APPLICATION

This patent application is a continuation-in-part of our earlier patent application entitled "SINGLE TRANSCEIVER LOGIC FUNCTION SERVING MULTIPLE INPUT/OUTPUT PORTS", Ser. No. 07/583,417 filed Sep. 14, 1990 now abandoned, and is incorporated herein by reference thereto.

BACKGROUND OF THE INVENTION

1. Field of the Invention

This invention generally relates to electronic circuits and methods for transmitting and receiving data, and more specifically relates to an Input/Output Controller Circuit and method for serving multiple Input/Output (I/O) ports with a single transmitter/receiver (commonly known as a transceiver).

2. Description of the Prior Art

In a typical computer system, such as an IBM PS/2 computer, each I/O port has a dedicated transceiver to perform the transmit/receive functions according to the needs of the I/O device coupled to the I/O port.

The technical specifications for the IBM PS/2 mouse and keyboard ports are described in IBM PS/2 Model 50 Technical Reference Manual, and are incorporated herein by reference. These ports are serial ports that communicate via serial bytes in a typical UART-type format, consisting of a start bit, seven data bits, an optional parity bit, and one or more stop bits. The mouse port has a single data line and a single clock line. These two signals are open-drain with a pull-up resistor so that different sources can drive these signals low as required. The mouse initiates a data transfer to the computer by asserting the clock line low, signaling to the computer that it has data to send. The mouse then activates the clock line for several clock cycles, and presents the appropriate data value on the data line for each negative clock transition, thereby shifting the serial data into the computer. The computer initiates a data transfer to the mouse by asserting the data line low and the clock line low, signaling to the mouse that the computer has data to send. The mouse then activates the clock line for several clock cycles, and clocks in the appropriate data value which the computer places on the data line for each negative clock transition, thereby shifting the serial data into the mouse. The keyboard port is identical in function to the mouse port as described above. In a typical PS/2 computer system there is one transceiver for the mouse port and a second transceiver for the keyboard port. Having one transceiver per I/O port is unnecessarily costly if a single transceiver can be used to serve both the mouse and the keyboard ports.

Therefore, there existed a need to provide an I/O controller circuit and method for using a single transceiver to service multiple I/O ports in a computer system such as a typical IBM PS/2.

SUMMARY OF THE INVENTION

It is an object of this invention to provide an I/O controller circuit and method that can serve multiple I/O ports using a single transceiver.

It is another object of this invention to provide an I/O controller circuit and method for serving the mouse and keyboard ports of an IBM PS/2 computer using a single transceiver.

According to the present invention, a small computer system such as an IBM PS/2 computer is provided which has a plurality of I/O ports to which I/O devices may be coupled. The clock and data lines of each I/O port are coupled to the I/O controller circuit of the present invention. This circuit has Arbitration Logic which controls the accessing of I/O ports to the single transceiver to assure the I/O devices coupled to the I/O ports are serviced in the appropriate priority and to assure that the transceiver operation is complete before servicing a different I/O port. In a typical computer system, the Arbitration Logic assigns priority to the I/O ports according to which I/O port requests service first. When the Arbitration Logic receives a request to transmit data from one of the I/O ports, it drives its Control Outputs to Input Select circuitry which routes the appropriate clock and data lines to the transceiver, and simultaneously to Output Select circuitry, which routes the output lines of the transceiver to the appropriate I/O device and locks out all other I/O devices until the data transfer for the first I/O device is complete. In this manner, a dedicated transceiver is not required for each I/O port. The added circuitry required by the Arbitration Logic, Input Select circuit and Output Select circuit is small compared to the circuitry required to implement a second transceiver. The circuit of the present invention thus allows a single transceiver to serve all I/O ports, thereby reducing system cost.

DESCRIPTION OF THE PREFERRED EMBODIMENT

Figure 1:
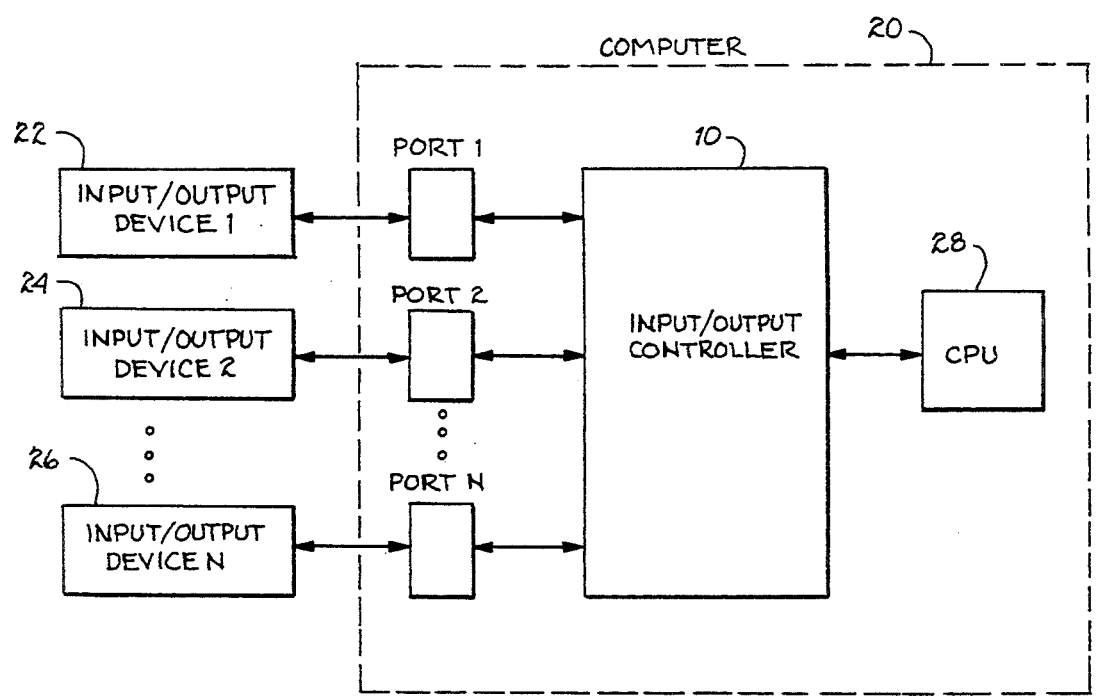
FIG. 1 is a block diagram of a typical computer system employing the Input/Output Controller circuit of the present invention to service multiple I/O devices.

As shown in FIG. 1, the Input/Output (I/O) Controller 10 of the present invention is used in a computer 20 to allow multiple I/O Devices 22, 24 and 26 to communicate with the CPU 28 using only one transceiver (not shown) within the I/O Controller 10. I/O Device 26 is shown as I/O Device N, representing that the number of ports serviced by a single transceiver can vary according to the specific application.

Figure 2:
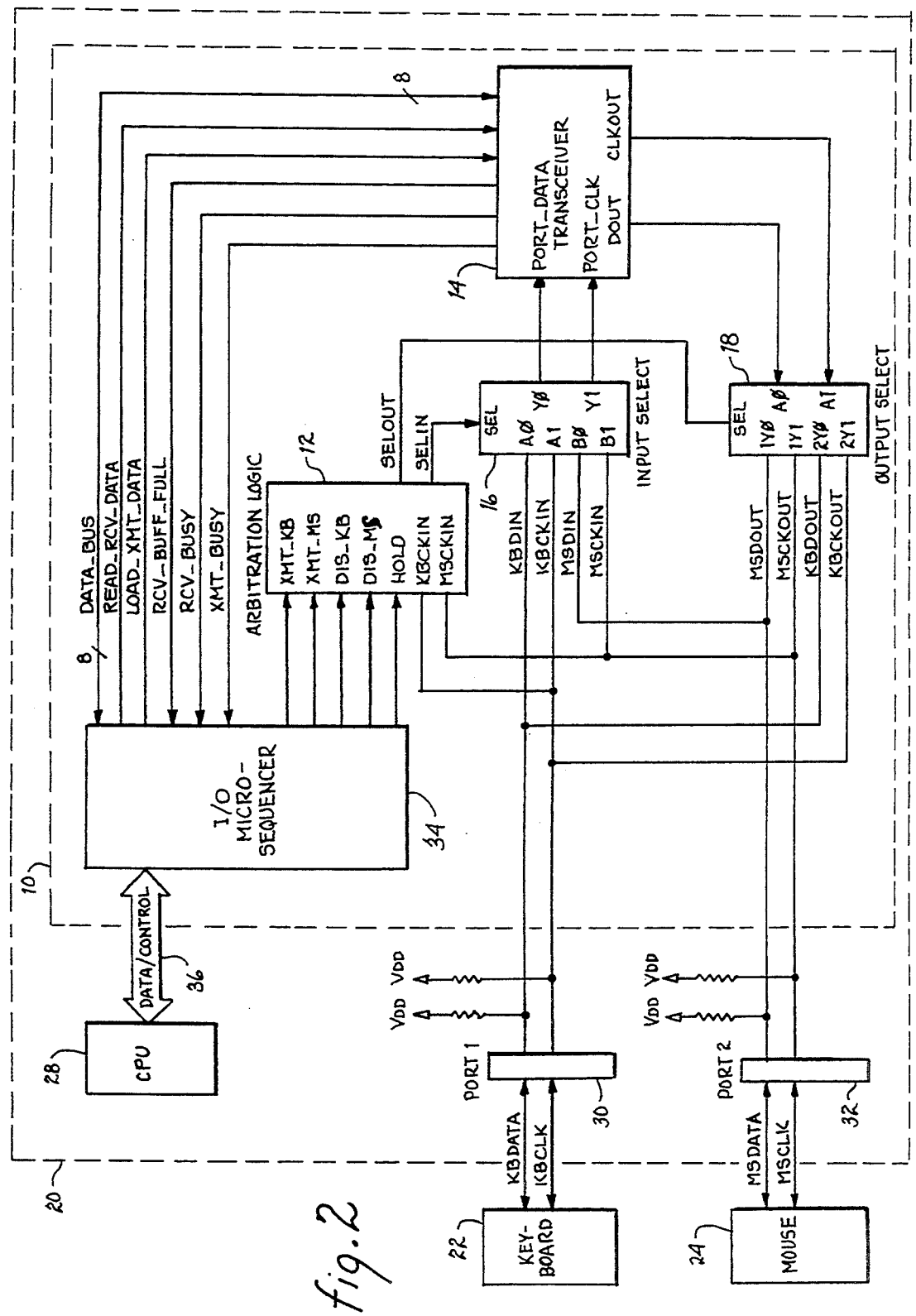
FIG. 2 is a schematic block diagram of one specific configuration of the computer system shown in FIG. 1 showing the Input/Output Controller used in an IBM PS/2 computer system, configured to service two I/O devices with a single transceiver.

FIG. 2 shows the detailed schematic block diagram for a specific implementation of the circuit of FIG. 1 when the computer 20 is an IBM PS/2 with a Keyboard Port 30 coupled to a Keyboard 22 and a Mouse Port 32 coupled to a Mouse 24. The present invention is, in essence, the use of a single Transceiver 14 to serve a plurality of I/O devices, each of which would normally require its own dedicated transceiver. The Arbitration Logic 12 controls the accessing of the Transceiver 14 by the I/O devices (Keyboard 22 and Mouse 24). The table below shows the signal names used in FIG. 2 and describes their function.

| Signal | Description |
| --- | --- |
| KBDATA | Keyboard Data (bidirectional - open drain) |
| KBCLK | Keyboard Clock (bidirectional - open drain) |
| MSDATA | Mouse Data (bidirectional - open drain) |
| MSCLK | Mouse Clock (bidirectional - open drain) |
| KBDIN | Keyboard Data In |
| KBCKIN | Keyboard Clock In |
| MSDIN | Mouse Data In |
| MSCKIN | Mouse Clock In |
| MSDOUT | Mouse Data out |
| MSCKOUT | Mouse Clock out |
| KBDOUT | Keyboard Data Out |
| KBCKOUT | Keyboard Clock Out |
| PORT_DATA | Data Input to Transceiver (from port) |
| PORT_CLK | Clock Input to Transceiver (from port) |
| DOUT | Data Output from Transceiver (to port) |
| CLKOUT | Clock Output from Transceiver (to port) |
| DATA_BUS | Data Bus - 8-bit parallel bus to transfer data between transceiver and micro-sequencer |
| READ_RCV_DATA | Read Receiver Data - Loads data in receive register in transceiver onto DATA_BUS |
| LOAD_XMT_DATA | Load Transmit Data - Loads data on DATA_BUS into transmit register in transceiver |
| RCV_BUFF_FULL | Receive Buffer Full - Asserted when the receiver has received a full byte of data |
| RCV_BUSY | Receiver Busy - Asserted while the receiver in the transceiver is receiving data. |
| XMT_BUSY | Transmitter Busy - Asserted while the transmitter in the transceiver is transmitting data |
| SELOUT | Select Out - Routes the CLKOUT and DOUT signals to the appropriate port |
| SELIN | Select In - Routes the appropriate port signals to PORT_CLK and PORT_DATA. |
| XMT_KB | Transmit Keyboard Indicates to Arbitration Logic to assert LOAD_XMT_DATA and to assert SELOUT and SELIN to select the keyboard |
| XMT_MS | Transmit Mouse - Indicates to Arbitration Logic to assert LOAD_XMT_DATA and to assert SELOUT and SELIN to select the mouse |
| DIS_KB | Disable Keyboard - Disables the arbitration Logic from selecting the Keyboard |
| DIS_MS | Disable Mouse Disables the arbitration logic from selecting the Mouse |
| HOLD | Hold - Holds Arbitration Logic in current state when asserted, allows arbitration when negated |

OPERATION

The operation of I/O Controller circuit 10 is best understood by examining the transmit and receive functions for one of the ports, since the function of the two ports is very similar. The discussion herein specifically describes, for example's sake, the operation of how CPU 28 and Keyboard 22 exchange data. When CPU 28 has data to transmit to Keyboard 22, it first writes the data into the I/O Micro-sequencer 34 via the Data/-Control bus 36 as shown. The I/O Micro-sequencer 34 then generates XMT—KB to the Arbitration Logic 12, indicating that data is to be transmitted to the Keyboard 22. The I/O Micro-sequencer 34 also outputs the data to be transferred onto DATA_BUS and generates LOAD_XMT_DATA to load the data on DATA_BUS into the transmitter register of Transceiver 14. In response to the XMT_KB signal, the Arbitration Logic 12 asserts SELIN such that Input Select 16 routes KBDIN to PORT_DATA and routes KBCKIN to PORT_CLK, and also asserts SELOUT such that Output Select 18 routes DOUT to KBDOUT and routes CLKOUT to KBCKOUT, while also holding MSCKOUT low. Holding MSCKOUT low holds MSCKIN low, since these two signals are tied together in the open drain configuration shown. In order for the Mouse 24 to initiate a data transfer, it must drive MSCKIN low when the Arbitration Logic 12 is prepared to arbitrate between the two ports. Therefore, driving MSCKOUT low effectively inhibits the Mouse 24 from sending data, until the transmit to the Keyboard 22 is complete.

Transceiver 14 then drives DOUT low to represent a start bit, which asserts KBDOUT low, which in turn drives KBDATA low. Transceiver 14 next drives CLKOUT low, which asserts KBCKOUT low, which in turn drives KBCLK low. When Keyboard 22 sees KBCLK go low when KBDATA is low, it knows it is to receive data, and clocks in the start bit. The Transceiver 14 then negates CLKOUT which causes KBCLK to go high. At this point the Keyboard 22 then takes control of the KBCLK line and drives it alternatively low and high, clocking data from the KBDATA line with each negative transition of the KBCLK line until all the bits in the transmitter register within Transceiver 14 have been clocked into Keyboard 22. While this data transmission is taking place, Transceiver 14 asserts the XMT_BUSY line to the I/O Micro-sequencer 34 to signal that the transmission is in progress. Once the last bit (stop bit) is shifted out of the transmitter register of Transceiver 14, the XMT_BUSY line is negated. This completes the transmission of one byte between the CPU 28 and the Keyboard 22.

Once the byte has been transferred from the CPU 28 to the Keyboard 22, the CPU 28 must receive an acknowledge from the Keyboard 22 to assure that data transmission occurred properly. For this reason, as soon as a transmission begins with the I/O Micro-sequencer 34 asserting the XMT_KB signal, the I/O Microsequencer 34 also asserts the HOLD line to assure the Arbitration Logic 12 continues to select the Keyboard 22 via the SELOUT and SELIN lines (and therefore, will not arbitrate) until the acknowledge has been received by the CPU 28 from the Keyboard 22, signaling that the transmission is complete. At this point the Arbitration Logic 12 begins arbitrating again, looking to service the port that next requests service.

When Keyboard 22 is ready to transmit data to CPU 28, it asserts the KBCLK line low, which in turn drives KBCKIN low. When the Arbitration Logic 12 sees KBCKIN go low, it asserts SELIN such that Input Select 16 routes KBCKIN to PORT_CLK and routes KBDIN to PORT_DATA, and also asserts SELOUT such that Output Select 18 routes CLKOUT to KBCKOUT and routes DOUT to KBDOUT, while also holding MSCKOUT low to inhibit the Mouse 24 from sending data until the data transmission from the Keyboard 22 is complete.

At this point the Keyboard 22 then takes control of the KBCLK line and drives it alternatively low and high, clocking data from the KBDATA line with each negative transition of the KBCLK line until all the bits are transmitted to the receiver register of Transceiver 14. While the Transceiver is receiving this serial byte from the Keyboard 22, it asserts the RCV_BUSY line to the I/O Micro-sequencer to indicate that a byte is being received. Once the last bit (stop bit) is shifted into the receiver register within Transceiver 14, Transceiver 14 asserts the RCV_BUFF_FULL signal to indicate to I/O Micro-sequencer 34 that a byte has been received. In response to this signal the I/O Micro-sequencer 34 generates the READ_RCV_DATA signal to Transceiver 14, which causes Transceiver 14 to load the byte of data in its receiver register onto the 8 lines of DATA_BUS, which the I/O Microsequencer latches as the received byte.

The CPU 28 and the Mouse 24 exchange data in the same way as the CPU 28 and the Keyboard 22. The only difference is that when a data transfer with the Mouse 24 occurs, the SELOUT and SELIN lines are in a different state than when a data transfer with the Keyboard 22 occurs, thereby routing MSDIN to PORT_DATA, MSCKIN to PORT_CLK, DOUT to MSDOUT and CLKOUT to MSCKOUT.

The I/O Micro-sequencer 34 also has the capability to disable either the Keyboard 22, Mouse 24 or both by asserting the DIS_KB or DIS_MS inputs to the Arbitration Logic 12. When DIS_KB is asserted, the Arbitration Logic 12 will not respond to requests to transfer data to or from the Keyboard 22. When DIS_MS is asserted, the Arbitration Logic 12 will not respond to requests to transfer data to or from the Mouse 24.

In the manner described herein, the I/O Controller circuit 10 of the present invention allows one Transceiver 14 to service multiple I/O ports by substituting some simple logic circuitry for one or more complex transceivers, thereby reducing system cost.

While the invention has been described in its preferred embodiment, it is to be understood that the words which have been used are words of description rather than limitation, and that changes may be made within the purview of the appended claims without departing from the true scope and spirit of the invention in its broader aspects. For example, while only two I/O devices (Keyboard 22 and Mouse 24) are shown in FIG. 2 for illustrative purposes, the circuitry of FIG. 2 could be easily modified to accommodate any number of I/O devices.

What is claimed is:

1. An input/output controller circuit for a small computer system comprising, in combination:
   a plurality of input means connecting to a corresponding plurality of input/output (I/O) ports, to which are connected a corresponding plurality of I/O devices;
   arbitration means coupled to said plurality of input means for selecting which of said plurality of I/O ports will be serviced, and having select output means having a number of states equal to the number of said plurality of I/O ports for selecting which of said plurality of I/O ports will be selected for a data transfer, each of said states corresponding to the selection of only one of said plurality of I/O ports;
   input select means having signal inputs coupled to said plurality of input means and having at least one control input coupled to said select output means of said arbitration means for providing one of said plurality of input means to signal outputs according to which of said states is selected by said select output means;
   transceiver means having signal input means coupled to said signal outputs of said input select means for receiving serial data from one of said I/O ports through said input select means, having control means for controlling the operation of said transceiver means, and having signal outputs for serial transmission of data within said transceiver means to one of said plurality of I/O ports, said transceiver means converting parallel data within said transceiver means to serial data for transmission to one of said plurality of I/O ports, and receiving serial data from said plurality of I/O ports and converting it into parallel data;
   output select means having signal inputs coupled to said signal outputs of said transceiver means, having signal outputs coupled to said plurality of input means, and having at least one control input coupled to said select output means of said arbitration means for providing said signal inputs to one of said plurality of input means according to which of said states is selected by said select output means; and
   sequencer means having input and control means for communicating with an external central processing unit (CPU), having signal input means coupled to said control means of said transceiver means for monitoring status of said transceiver means, having first output means coupled to said control means of said transceiver means for controlling the operation of said transceiver means, and having second output means coupled to said arbitration means for controlling the operation of said arbitration means, said sequencer means providing an appropriate sequence of signals on said first and second output means in response to signals received on said input and control means and said signal input means.

2. The circuit of claim 1 wherein said input means are open-drain thereby allowing an output coupled to one of said plurality of input means to drive said one of said plurality of input means low, said input means being pulled high through at least one resistor when said output is negated.

3. The circuit of claim 1 wherein each of said plurality of input means comprising a clock line and a data line for each of said I/O ports.

4. The circuit of claim 3 wherein said output select means including at least one output coupled to said clock line of each of said I/O ports except the one selected by said select out means, said output asserting said clock line low, thereby inhibiting data transfer to and from the corresponding I/O port until said clock line is negated.

5. A method for servicing a plurality of I/O ports with a single transceiver means comprising the steps of:

providing a plurality of input means connecting to a corresponding plurality of input/output (I/O) ports, to which are connected a corresponding plurality of I/O devices;

providing arbitration means coupled to said plurality of input means for selecting which of said plurality of I/O ports will be serviced, and having select output means having a number of states equal to the number of said plurality of I/O ports for selecting which of said plurality of I/O ports will be selected for a data transfer, each of said states corresponding to the selection of only one of said plurality of I/O ports;

providing input select means having signal inputs coupled to said plurality of input means and having at least one control input coupled to said select output means of said arbitration means for providing one of said plurality of input means to signal outputs according to which of said states is selected by said select output means;

providing transceiver means having signal input means coupled to said signal outputs of said input select means for receiving serial data from one of said I/O ports through said input select means, having control means for controlling the operation of said transceiver means, and having signal outputs for serial transmission of data within said transceiver means to one of said plurality of I/O ports, said transceiver means converting parallel data within said transceiver means to serial data for transmission to one of said plurality of I/O ports, and receiving serial data from said plurality of I/O ports and converting it into parallel data;

providing output select means having signal inputs coupled to said signal outputs of said transceiver means, having signal outputs coupled to said plurality of input means, and having at least one control input coupled to said select output means of said arbitration means for providing said signal inputs to one of said plurality of input means according to which of said states is selected by said select output means;

providing sequencer means having input and control means for communicating with an external central processing unit (CPU), having signal input means coupled to said control means of said transceiver means for monitoring status of said transceiver means, having first output means coupled to said control means of said transceiver means for controlling the operation of said transceiver means, and having second output means coupled to said arbitration means for controlling the operation of said arbitration means, said sequencer means providing an appropriate sequence of signals on said first and second output means in response to signals received on said input and control means and said signal input means;

said arbitration means selecting one of said states according to said second output means of said sequencer means and the state of said plurality of input means; said transceiver means transferring parallel data within said transceiver means to one of said plurality of I/O ports in serial fashion according to said state of said select output means for a data transfer to one of said plurality of I/O ports, said transceiver means accepting serial data from one of said plurality of input means, converting said serial data into parallel data, transferring said parallel data to said sequencer means where said parallel data is available to said CPU for a transfer from one of said plurality of I/O ports.

* * * * *